July 1, 1969     A. L. LOCKER     3,453,404
HEAT SENSITIVE TRIGGERING APPARATUS
Filed Jan. 9, 1968
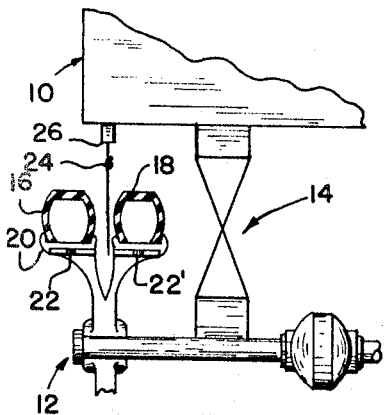
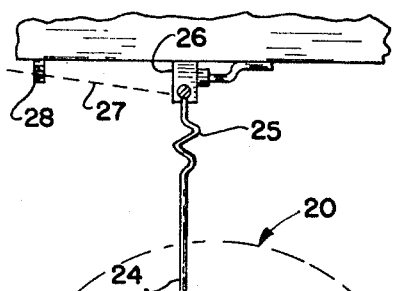
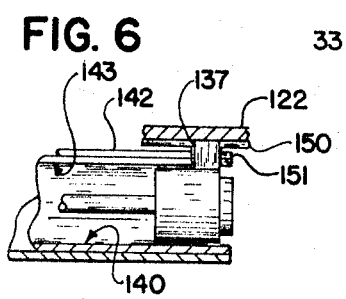
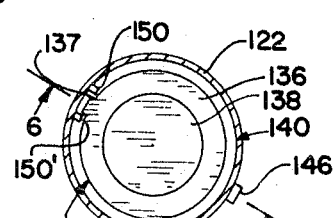
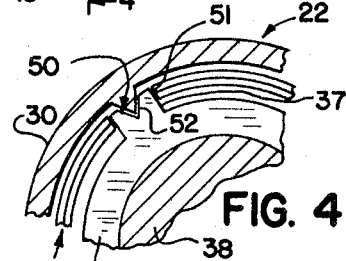
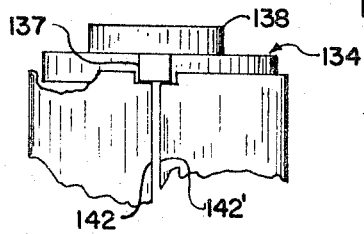
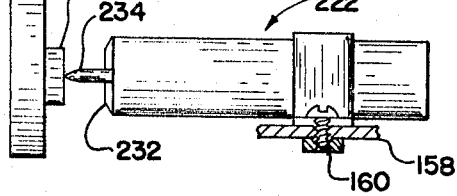
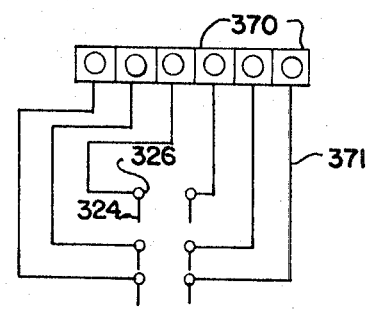
*INVENTOR.*
ARTHUR LEON LOCKER
BY
MARCUS L. BATES

United States Patent Office 3,453,404
Patented July 1, 1969

3,453,404
HEAT SENSITIVE TRIGGERING APPARATUS
Arthur Leon Locker, P.O. Box 943,
McCamey, Tex. 79752
Filed Jan. 9, 1968, Ser. No. 696,553
Int. Cl. H01h 37/32, 61/01
U.S. Cl. 200—61.22         10 Claims

ABSTRACT OF THE DISCLOSURE

A heat sensitive triggering apparatus located within a hermetically sealed housing which includes a combination guide and seal means at one end thereof, a tubular bimetal element coextensive with one wall surface of the housing, and having a longitudinal slot in which the bimetal element which is coextensive with a plunger and which cooperates with a head of the plunger to normally maintain the plunger shaft retracted within the housing. Spring biasing means urges the depending end of the plunger toward the seal and guide means whereupon a rise in temperature causes the bimetal element to expand, thereby releasing a lug on the plunger head to permit the spring biasing means to force the plunger shaft through the guide and seal means where the depending end of the shaft emerges from the housing to thereby trigger various apparatus.

One form of the invention utilizes the triggering apparatus to indicate a dangerous rise in temperature of a pneumatic tire.

Background of the invention

Hermetically sealed temperature responsive triggering devices are known in the past art. These devices are generally complex, expensive to manufacture, and cannot be used in all systems because of the cost associated therewith.

In a vehicle having pneumatic tires associated therewith, the tires often become overheated due to under-inflation of the vehicle tire or because the tire is subjected to an overloaded condition. Sometime a dragging brake band will also cause the wheel bearings and pneumatic tire to become overheated causing a drastic reduction in the life of the tire as well as other vehicle components. Large truck tires are expensive and a primary cause of the deterioration of truck tires can be attributed to low inflation pressure. Low inflation pressures are difficult to detect by a truck driver for the reason that the low tire will generally be one of a dual pair, which merely transfers its load to the adjacent tire upon becoming under-inflated, whereupon both tires are caused to be unduly flexed and overheated.

Summary

The present invention includes a sub-combination in the form of a heat senstive triggering apparatus which is used in combination with an alarm system for detecting a rise in temperature.

The sub-combination as embodied herein sets forth a hermetically sealed triggering apparatus having a spring biased plunger. The plunger is coextensive with a housing and a tubular bimetal element. The plunger includes a shaft having a head thereon which is held captive by the bimetal element, with the free depending end of the shaft being biased towards a seal and guide means. A rise in temperature allows the bimetal to expand, thereby releasing a lug associated with the plunger head, whereupon a kerf associated with the lug cooperates with a guide rail associated with the inside wall of the housing to permit the plunger shaft to travel through the seal and guide means where the shaft is used to provide a signal indicating the rise in temperature.

The alarm system is embodied in a combination circuit and apparatus for signaling a warning to a truck driver of an overheated tire. The above described triggering device is mounted in heat sensing relationship to a pneumatic tire whereupon a rise in temperature thereof releases the plunger shaft which contacts a wire to thereby form a current flow path which indicates the presence of an overheated tire.

It is, therefore, a primary object of the present invention to provide a heat sensing triggering apparatus which is actuated in response to an elevation in temperature to thereby release a portion of the apparatus which can be used to indicate the presence of the rise in temperature.

Another object of the present invention is the provision of a hermetically sealed heat sensitive triggering device which is actuated by a bimetallic element and which remains reliable over a long period of time.

A still further object of the present invention is the provision of a heat sensitive triggering apparatus having means associated therewith to indicate a rise in temperature.

A further object of the present invention is the provision of a heat sensitive apparatus associated with a vehicle which indicates an abnormal rise in temperature of a vehicle pneumatic tire.

A further object of the present invention is an alarm system associated with a vehicle which indicates a rise in temperature of any one of the pneumatic tires associated therewith.

Brief description of the drawings

FIGURE 1 is a fragmentary partly cross-sectional, partly schematical representation of a portion of a vehicle;

FIGURE 2 is an enlarged fragmentary schematical representation showing a side view of FIGURE 1;

FIGURE 3 is an enlarged cross-sectional representation of a portion of the device seen in FIGURES 1 and 2;

FIGURE 4 is an enlarged fragmentary cross-sectional view of part of the device seen in FIGURE 3 and taken substantially along line 4—4 thereof;

FIGURE 5 is a modification of the device seen in FIGURE 3;

FIGURE 6 is a cross-sectional view taken along line 6—6 of FIGURE 5;

FIGURE 7 is an enlarged side elevational view of the device seen in FIGURES 5 and 6, with some parts being broken away in order to better illustrate the device;

FIGURE 8 is a side elevational view illustrating still another function of the device seen in FIGURES 3 through 7; and FIGURE 9 is a schematical representation of an electrical circuit further showing the utility of FIGURES 1 through 7.

Detailed description of the preferred embodiments

Looking now to the details of the drawings, wherein there is seen illustrated in FIGURES 1 and 2 a vehicle body 10 supported by a wheel assembly 12 which is sprung from the body in the usual manner as schematically illustrated at 14, all of which is known to those skilled in the art. The illustrated wheel assembly is shown to include two spaced apart pneumatic tires 16, 18, sometime called dual wheels, each suitably affixed to a usual tire mounting means 20, each of which constitutes one of the dual wheels. Adjacent the metal wheel and in close proximity to the spaced apart beads of the tire there is seen rigidly attached thereto a heat sensitive triggering apparatus 22, 22', made in accordance with the present invention, the details of which will be carelly set forth in a portion of this disclosure later on.

Downwardly depending from the body 10 there is seen a stainless steel resilient wire 24 having a free depending end which extends downwardly past the triggering apparatus with the remaining terminal end being affixed to the body at sensing device 26. As indicated in FIGURE 2, the stainless steel wire includes a coil 25 which more or less forms a hinge to enable the wire to be moved to the illustrated position indicated by the dashed-dot line 27 when the wire is removably captured within bracket member 28 where it is held away from the tires when the device is not in use.

Looking now to the details of FIGURE 3, in conjunction with the remaining figures, wherein there is seen the details of one embodiment of the before mentioned triggering apparatus 22. The elongated tubular enclosure formed by the housing 30 is preferably cylindrical in cross-section and includes end walls 31 and 32, with end wall 32 being fabricated into a disk by utilizing a resilient material. A pre-formed aperture is seen at 33 which is centrally aligned with the central longitudinal axis of the housing. The compressive action exerted by the housing against the outer peripheral surface of the disk maintains the aperture sealed or closed much like the inflation valve of an inexpensive football which maintains itself sealed but which can be inflated by inserting a hollow needle therethrough, all in a manner known to those skilled in the art.

Plunger 34 includes a shaft end 35 which terminates in a blunt point with the point being received by a portion of the indicated closed passageway formed by the aperture 33. The remaining end of the lunger includes a head 36 having a tange or lug 37 extending therefrom and a reduced diameter portion 38 which receives biasing means in the form of a spring 39 thereabout. The spring is maintained compressed between the head and end wall 31. Bimetal element 40 has an inside peripheral wall surface 41, an outside peripheral wall surface 42, and is comprised of a first cyindrical metallic member 43 and a second metallic member 44 which cooperate together to form a bimetal element. The housing forms an insider peripheral wall 45. Bimetal element 40 is longitudinally split along the indicated seam generally indicated at numeral 40' with the opposite side being secured to the housing by means of fasteners 46, 46' thereby leaving a space between the longitudinal split 40' and the inside peripheral wall of the housing as generally illustrated by the numeral 48. The longitudinally extending rail 50 cooperates with a complementary V 52, hereinafter called a kerf, which is illustrated as being located within lug 37, and which prevents rotational movement of the plunger as the lug is released by the depending end 40' of the bimetal element 40.

Looking now to the details of FIGURES 5 through 7 wherein various modifications of FIGURES 3 and 4 are shown in order to generally illustrate another of several embodiments of the triggering apparatus, part of which will be repetitious but which will enable one to more fully understand the present invention.

As seen in the modification set forth in FIGURES 5 and 6, housing 122 includes spaced apart rail members 150, 150' which maintain the lug 137 slidably captured therebetween. Head 136 of the plunger 34 includes the reduced diameter portion 138 which corresponds to the plunger head of FIGURE 3. Fastener 146 maintains the bimetal 140 secured to the inside peripheral wall of the housing 122 so as to maintain the depending ends 142, 143 of the bimetal element 140 properly aligned with respect to the spaced apart rails and the lug.

FIGURE 7 is a generalization of the foregoing figures, and is a side elevational view showing the relationship between the lug and the terminal end of the bimetal elements in order to enable a thorough understanding of the cooperative action of the bimetal element and plunger of the various embodiments.

Looking now to the details of FIGURE 8, wherein there is seen a triggering device 222 fabricated substantially in accordance with any one of the foregoing embodiments of the invention, and wherein the triggering device is suitably mechanically and electrically attached to any structure 158 by means of a conventional fastener 160 with the end wall 232 being spaced apart from a suitable alarm device 162 having an electrical switch actuator 164 which sounds an alarm when moved by the illustrated plunger 234, which is shown as having been triggered and therefore is extending through the seal and guide means 232 into abutting relationship with the switch 164 of the alarm.

Looking now to the details of FIGURE 9 wherein there is seen a multiplicity of warning lights, sometime called a Klaxon 370, with each Klaxon being suitably connected by electrical conduits 371 to a wire 324 which corresponds to wire 24 of FIGURES 1 and 2, and which in turn is connected to a current flow sensing means 326 which corresponds to sensing means 26 of FIGURES 1 and 2. Each of the wires 324 is attached in the illustrated manner of FIGURES 1 and 2 between the wheels of a truck whereupon an undue temperature rise of any one wheel associated therewith will cause the triggering device to extend the plunger shaft 234 into electrical or mechanical contact with the wire.

*Operation*

FIGURES 1 and 2 illustrate one use of the various embodiments of the heat sensitive triggering devices illustrated in the figures, wherein the heat sensitive triggering device is securely attached, by spot welding or by the use of suitable fastener means to a metallic portion of the wheel which is closely adjacent to the air chamber of a pneumatic tire, in a manner as seen illustrated at 22, 22' in FIGURE 1. Downwardly depending from a current sensing device attached to the vehicle body is a whip type antenna, preferably in the form of a resilient length of stainless steel, with the lower depending end portion of the stainless steel extending below the heat sensing triggering device. Should a tire adjacent the triggering device become overheated for any reason whatsoever, upon attainment of a predetermined temperature level the triggering device will release the plunger associated therewith to thereby contact the whip antenna for a limited length of time each rotation of the wheel. When it is desired to perform maintenance upon the wheel of the vehicle, the whip antenna is bent back onto a bracket where it is secured out of the way in the illustrated manner of FIGURE 2. To facilitate displacing the antenna from the wheel, a portion of the antenna is provided with a coil which forms a hinge as is known in the art of whip antennas.

Looking now more in detail to the specific embodiment of the triggering device illustrated in FIGURES 3 and 4, it will be understood by those skilled in the art, having now read the foregoing descriptive portion of the invention, that the bimetal element 40 is anchored 180° away from the longitudinal slit 40' in a manner to leave a space 48 between the housing and the end portions of the bimetal element. Rail 50 cooperates with the kerf 52 of lug 37 to maintain the plunger secured against rotational movement. The shaft formed by the depending end portion of the plunger is maintained in proper alignment with the seal and guide means by the aperture 33, into which the free depending end of the plunger slightly protrudes. Biasing means in the form of a compressed spring maintains the plunger lug compressed against slot 151, for example, whereupon expansion of bimetal element 40 permits the edge portions of the slot of the bimetal element to increase the distance between the spaced apart end portions whereupon the lug is released by the indented slot 51 or 151, thereby permitting the lug to travel down the spaced apart edge portions 40' while the rail 50 guides the kerf of the lug as the plunger shaft is forced through the aperture of the seal to thereby enable the depending free end portion of the shaft to activate an alarm. Release of the plunger in a manner whereupon the shaft thereof protrudes through the aperture 33 is termed "triggering." The triggering action of the heat sensitive triggering device is utilized to perform many different functions, several of which are illustrated and discussed herein.

Looking now to the details of FIGURES 5 through 7, there is seen another modification of the invention wherein spaced apart rails 150, 150' perform the function of preventing rotational movement of the plunger, while at the same time enabling the plunger to reciprocate within the housing 122. The bimetal element of FIGURE 5 is not shown in order to more clearly illustrate the invention. As seen in FIGURE 5 in conjunction with FIGURES 6 and 7, it will now be seen that the absence of a guide means, such as the kerf and lug, may enable the plunger to abut against one of the edge portions of the bimetal element, whereupon expansion of the element enables the lug of the plunger to rotatably ride therewith as the element expands. Accordingly, guide means enable the bimetal element to slidably ride out from under the lug as the bimetal element expands, whereupon the lug is released to thereby freely slide down the longitudinal slot as the spring pushes the shaft 34 through the aperture 33.

FIGURE 8 shows still another use of the present apparatus wherein an alarm means which is provided with a switch is placed in operative relationship with a heat sensitive triggering device. A rise in temperature causes the plunger to be released to thereby exert sufficient pressure against the switch to thereby actuate various alarm systems.

Looking now to the details of FIGURE 9 wherein there is seen six signals, or lights, sometimes called a Klaxon, wherein each light is connected to a current flow sensing means which in turn is connected to a stainless steel wire 324. The stainless steel wire is positioned adjacent the pneumatic tire and wheel similar to the illustration of FIGURES 1 and 2, whereupon the heat sensitive apparatus, upon being subjected to an elevated predetermined temperature, contacts the wire or antenna each revolution of the wheel to thereby illuminate one of the lights whereupon the driver is warned of impending disaster since one of his pneumatic tires has become dangerously overheated.

It will be understood that the current sensing device 26 could also be in the form of a switch which is actuated when bent out of alignment by the plunger shaft.

The foregoing is considered as illustrative only of the principles of the invention. Further, since numerous modifications and changes other than those illustrated herein will readily occur to those skilled in the art, it is not desired to limit the invention to the exact construction and operation shown and described, and accordingly all suitable modifications and equivalents may be resorted to falling within the scope of the invention as claimed.

I claim:
1. A heat sensitive triggering apparatus comprising a housing, a bimetal element, a plunger having a head and a shaft with the shaft extending therefrom, biasing means, and seal means;
    said seal means forming a wall of said housing and adapted to slidably receive said shaft therethrough;
    said bimetal element being located within said housing, between said head and said seal means, with said shaft extending through said bimetal element;
    said biasing means urging said head toward said seal means;
    said bimetal element having means associated therewith and with said head which normally maintains said plunger shaft retracted and which expands when hot to enable said bimetal to disengage from said head; whereby said heat sensitive triggering device is heated, said bimetal expands to thereby release said head and to enable said shaft to travel through said seal means.

2. The apparatus of claim 1 wherein said housing is an elongated tubular enclosure with said seal means being comprised of an apertured resilient disk which is received in one end of said enclosure to thereby form said wall;
    means forming an aperture through said seal means with said aperture being normally compressed into closed configuration to thereby hermetically seal said enclosure;
    said shaft having a free depending end portion with a limited portion thereof being guidably received within a limited length of said aperture to thereby maintain said shaft longitudinally aligned with said housing.

3. The apparatus of claim 1 wherein said bimetal element has two spaced apart end portions and is longitudinally disposed within said housing and provided with two spaced apart edge portions which defines a longitudinally extending seam;
    one end of said bimetal element being disposed adjacent said seal, the remaining end of said bimetal element being spaced apart from a wall of said housing; said edge portions adjacent the remaining end of said bimetal element being provided with a slot;
    said head having a lug thereon which is normally held captive within said slot;
    said biasing means located between said head and the last said wall and to thereby bias said head toward said seal; whereby:
    said bimetal, when heated sufficiently, releases said lug from said slot.

4. The apparatus of claim 3 and further including means securing said bimetal element to said housing at a point oppositely located with respect to said seam;
    means forming a kerf in said lug;
    means forming a longitudinally extending rail on an inside wall surface of said housing;
    said kerf sildably cooperating with said rail whereby said plunger is secured against rotational movement.

5. The apparatus of claim 3 and further including:
    means securing said bimetal element to said housing to thereby prevent relative rotational movement therebetween;
    means forming spaced apart longitudinally extending rails on the inside wall of said housing;
    said lug being guidably and slidably received between said rails where it is secured against rotation.

6. The apparatus of claim 1 wherein said bimetal element has two spaced apart end portions and is longitudinally disposed within said housing and provided with two spaced apart edge portions which defines a longitudinally extending seam;
    one end of said bimetal element being disposed adjacent said seal, the remaining end of said bimetal element being spaced apart from a wall of said housing; said edge portions adjacent the remaining end of said bimetal element being provided with a slot;
    said head having a lug thereon which is normally held captive within said slot so as to enable said bimetal, when heated sufficiently, to release said lug from said slot;
    said biasing means located between said head and the last said wall and to thereby bias said head toward said seal;
    means securing said bimetal element to said housing to thereby prevent relative rotational movement therebetween;
    means forming spaced apart longitudinally extending rails on the inside wall of said housing;
    said lug being guidably and slidably received between said rails where it is secured against rotation.

7. The apparatus of claim 1 wherein said housing is an elongated tubular enclosure with said seal means being comprised of an apertured resilient disk which is received in one end of said enclosure;

said aperture of said seal means being normally compressed into a closed configuration to thereby hermetically seal said enclosure;

said shaft having a depending end portion with a limited portion thereof guidably received within a limited length of said aperture to thereby maintain said shaft longitudinally aligned with said housing;

means securing said bimetal element to said housing to thereby prevent relative rotational movement therebetween;

means forming spaced apart, longitudinally extending rails on the inside wall of said housing; and said lug being guidably and slidably received between said rails where it is secured against rotation.

8. The apparatus of claim 1, and further including sensing means including an elongated member extending therefrom, said elongated member adapted to extend from a vehicle body into close proximity of a tire mounted on a wheel mounted on the vehicle;

said heat sensitive triggering apparatus being attached to the wheel in close proximity to the spaced apart beads of the tire with said shaft adapted to extend into contact with said elongated member when said triggering apparatus is actuated, to thereby indicate a rise in temperature of the weel.

9. The improvement of claim 8 wherein said sensing means includes a relay which senses current flow through said elongated member when said triggering device is actuated.

10. The improvement of claim 8 wherein said sensing means includes a switch which is moved to the current flow position by said elongated member when said triggering device is actuated.

References Cited

UNITED STATES PATENTS

| | | | |
|---|---|---|---|
| 2,442,104 | 5/1948 | Twombly | 340—58 |
| 3,181,118 | 4/1965 | Perry | 200—61.23 |
| 3,283,300 | 11/1966 | Hartmann | 200—61.23 |
| 3,346,843 | 10/1967 | Lambert | 200—61.23 |
| 3,380,021 | 4/1968 | Dubar | 337—1 |
| 3,398,398 | 8/1968 | Johnson | 200—61.22 |

H. O. JONES, *Primary Examiner.*

U.S. Cl. X.R.

337—1; 340—58